यूनाइटेड स्टेट्स पेटेंट

United States Patent [19]
Wald

[11] 4,160,917
[45] Jul. 10, 1979

[54] ENERGY CONSERVING TRANSFORMER POWER SUPPLY SYSTEM

[76] Inventor: Herman Wald, 97-11 Horace Harding Expressway, Queens, N.Y. 11368

[21] Appl. No.: 866,935

[22] Filed: Jan. 4, 1978

[51] Int. Cl.² .......................................... H02J 9/06
[52] U.S. Cl. ................................ 307/64; 307/74; 307/81; 307/85
[58] Field of Search ................ 307/83, 64, 70, 74, 307/80, 81, 86, 132 R–200 R, 85; 340/309.1, 309.6

[56] References Cited

U.S. PATENT DOCUMENTS

| 548,789 | 10/1895 | Searles | 307/83 |
|---|---|---|---|
| 1,654,303 | 12/1927 | Moss | 307/83 |
| 3,934,155 | 1/1976 | Galitsyn | 307/64 |
| 3,936,782 | 2/1976 | Moakler | 307/64 |

Primary Examiner—L. T. Hix
Assistant Examiner—S. D. Schreyer

[57] ABSTRACT

An energy conserving transformer power supply system comprising one main transformer of large capacity to carry the maximum load under normal occupancy hours and one auxiliary transformer of relatively very small capacity to carry the utmost minimum load under non-occupancy hours (nights & week-end) being supplied from the same load distribution center. A transfer switching means is provided to alternately transfer the power supply from main to auxiliary transformer or vice-versa in response to the control action of a program timer switching means in accordance with the timing schedule of the occupancy and non-occupancy hours.

Additional current sensing means is provided to override the program timer switching action should the demand load exceed a predetermined low level and to restore the main control action on the program timer after cessation of such temporary condition.

An alternate simplified arrangement provides a steady energization of the auxiliary transformer, while the de-energization of the main transformer is controlled by a program timer in combination with various control means.

For a plurality of transformer units installed on various floors of tenant spaces in office buildings, a master program timer control means is provided in a central location to maintain the building control over the time-scheduled operation of the transfer switching means, and temporary overriding is selectively provided.

By the controlled de-energization methods provided in this invention, a substantial reduction of the no-load losses of the main transformer is accomplished.

9 Claims, 11 Drawing Figures

ENERGY CONSERVING TRANSFORMER POWER SUPPLY SYSTEM

This invention relates to energy conservation methods regarding the usage of power supply transformers in office buildings, industrial enterprises, etc, during the non-occupancy periods such as nights, weekends, holidays, etc, amounting to about 70% of the full time energization vs. 30% for the actual occupancy periods.

More specifically stated, it relates to a novel operating method of the power supply transformers to substantially reduce the no-load losses occuring continuously as long as the transformer is energized. Accordingly, the principles of this invention provide a main transformer to be energized during the actual occupancy hours requiring full load supply and a comparatively very small capacity auxiliary transformer in the range of 5% to supply minor loads required only during the non-occupancy hours, at which time the main transformer becomes de-energized for energy saving purposes.

As an illustration, in larger office buildings the utility power service generally consists of a 277–480 volts 3 phase system supplying all power loads and fluorescent lighting due to economy in wiring. However, there are loads such as: appliances, receptacles for lighting, small capacity motor equipment and various other loads that must be supplied from a 120–208 volt 3 phase system. For this purpose, a step-down transformer is utilized for supplying all such loads. The capacity of such step-down transformers may range from 250 to 1500 KVA. In case of multistory office buildings, each floor may have a 50 KVA transformer so that for 20 floors it would amount to a total of 1000 KVA. Thus the continuous energization increases the operational cost with an average 3% to 4% of the transformer no-load losses during the non-occupancy periods amounting to 70% of the total time.

An important feature is to supply the same load distribution center alternately by either of the transformers so that during the non-occupancy periods the auxiliary transformer merely supplies a maximum 5% load being constantly required. Therefore it is not necessary to determine anticipative the selected circuits as the complete load distribution center is energized up to a given limited power as per rating of the auxiliary transformer. Should occasionally any tenant necessitate overtime work during the non-occupancy hours, a sensing means shall be actuated by the overload to automatically energize the main transformer and de-energize the auxiliary transformer until such time that the demand will decline to the minimum load corresponding to the non-operating periods at which time the auxiliary transformer is automatically re-energized.

Under such operating requirements, the main and auxiliary transformer are independently wired to the main power source and to the same load distribution center and by the application of a transfer switching means, the transformers cannot operate simultaneously but in succession in accordance with the determined timing schedule, or sensing of minimum load requirement.

Another simplified arrangement would be to regroup the load distribution center to main load necessary during the occupancy hours and auxiliary load merely necessary during the non-occupancy hours. Accordingly, some preselected circuits being required to be constantly energized are taken-off from the main load distribution center and rewired to the auxiliary panel to operate it during both the occupancy and non-occupancy periods. In this case, some automatic switching means is disposed to main transformer to control its actuation as per determined timing-schedule. Provision is made to re-energize the main transformer during the non-occupancy hours if any tenant requires over-time work until its completion, whereupon it becomes de-energized again.

Although this method requires a relatively simple and low cost of installation to effect the timed transfer of power from the main transformer, however, it has the drawback that the constant energization of minimum circuits may vary from tenant to tenant when occupancy changes and therefore the regrouping must eventually be changed to suit the new tenant's requirement if it is the case.

For multistory office building applications having a step-down transformer installed on each floor, a master program timer control means is utilized at a central location in order to maintain the building owner's control over the de-energization of the main transformers supplied by a common power riser feeder. Various control methods are provided to extend the energization of the main transformer on each particular floor, should any tenant require work beyond the normal occupancy hours. In such case there are provisions made to de-energize again the main transformer after completion of such over-time work.

One of the main objects of this invention is to provide an energy conserving transformer power supply system consisting of the combination of a main transformer to be energized during the occupancy periods and a relatively small capacity auxiliary transformer to be energized during the non-occupancy periods to reduce the non-load losses of the main transformer.

An important object of the invention is to establish the method allowing the complete load to be connected to both the main and auxiliary transformer and to provide switching means to alternately change over the power supply from one to the other transformer so that simultaneous operation shall be prevented.

Another object of the invention is provide a program-timer control means to actuate the energization of the main transformer during the occupancy periods and the energization of the auxiliary transformer during the non-occupancy periods as per a predetermined timing schedule.

A specific object of the invention is to provide control means to actuate the re-energization of the main transformer and the de-energization of the auxiliary transformer should the load demand in any time moment during the non-occupancy periods exceed a predetermined limit value as per maximum rating of the auxiliary transformer. Thus if the demand declines again, the control action switches over the energization on the auxiliary transformer.

Further object of the invention is to provide a simplified arrangement consisting of a main and auxiliary load distribution center corresponding to the occupancy and non-occupancy load requirements, whereby the auxiliary transformer remains constantly energized, whereas the main transformer is controlled as per the timing-schedule and/or momentary load requirements during the non-occupancy periods.

A further important object of the invention is to apply its principles to a plurality of transformers located on various floors being supplied by a common power riser feeder. The energization of the transformers to be controlled by a master program timer control means through either a momentary switching action or through separate control wiring. Further provision is made to temporary re-energize or de-energize any of the transformers should over-time work required by any particular occupant.

Further objects of the invention lie in the combination of the various above mentioned arrangements to form a complete combined transformer power supply system and also include the various subcombinations of the elements and their interrelation.

The objects of the invention will become more evident from the detailed descriptions presented in conjunction with the accompanying drawings and for better understanding reference will be made to them in which.

Figure 1:
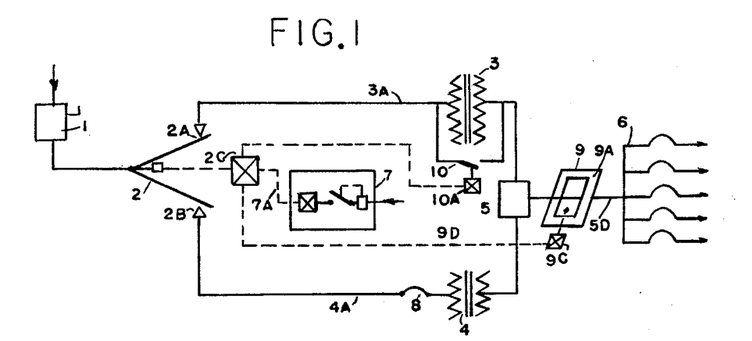
FIG. 1 is a diagrammatic illustration of the basic principles of the invention to include all elements such as: main transformer, auxiliary transformer, switching and control means to form a complete energy conserving transformer power supply system.

Referring more particularly to FIG. 1 in which a diagrammatic view of a complete energy conserving transformer power supply system is represented in accordance with the invention to provide a substantial reduction of the transformer no-load losses. In this application the specific feature lies in the fact that to any transformer supplying a main load distribution center, an additional auxiliary transformer of relatively very small capacity, say about 5%, is connected to the same load distribution center without any regrouping of the load in order to supply a light demand load during the non-occupancy periods. This method provides an utmost simplified and low cost wiring for the auxiliary transformer.

In FIG. 1 reference character 1 denotes an alternating current power service switch supply of single or 3 phase type with fuse or breaker tripping protection supplying an automatic transfer switch denoted by the numeral 2 providing an interlocked mechanism to assume a double throw operation with upward and downward positions 2a and 2b respectively. The main power transformer denoted by reference numeral 3 being normally utilized during the occupancy hours and the auxiliary transformer denoted by the reference numeral 4 normally utilized during the non-occupancy hours and are on the line side connected by wiring 3a and 4a, respectively, to the respective terminals 2a, 2b of the transfer switch 2.

The load side of both said transformers 3 and 4, are wired to a common terminal 5 which, in turn, is connected by wiring 5d to the main load distribution center denoted by the reference numeral 6. A conventional program timer switching means denoted by the reference numeral 7 is normally utilized to control the energization of the transformers. The timer is connected by wiring 7a to the operating control coil 2c of the transfer switch 2 to actuate the energization of said coil 2c as per a predetermined timing schedule, whereby the position of the transfer switch changes to alternately supply power to either of the transformers in accordance with the occupancy and non-occupancy hours requirements.

Reference numeral 8 denotes a circuit protective means consisting of fuses or breaker with tripping to be wired in series with the auxiliary transformers 4 to provide circuit protection against excessive currents eventually drawn by the load center 6 during the non-occupancy hours to be considered as a momentary condition.

In order to prevent the flow of current having a magnitude above the rating of the auxiliary transformer, a current sensing relay means denoted by the reference character 9 being inserted in series with the main load line. As a preferred embodiment, the current sensing means 9 having a core structure 9a to allow passing through the conductor 5d carrying the main load current for the purpose of sending the magnitude of current flowing therethrough and to produce therein a proportionate flux.

Such a current sensing relay normally includes a contact device 9c being preset to be actuated by a predetermined magnitude of flux. The contact device 9c is connected by wiring 9d to the operating coil 2c of the transfer switch 2. Upon actuation, the position of the transfer switch is changed to transfer the power from the auxiliary transformer to main transformer or vice versa as may be required by the momentary variable load current flow.

In the actual operation, should the demand of current exceed the preset value permitted to flow through the auxiliary transformer, the current sensing relay contact device 9c, in turn, actuates the transfer switch coil 2c to change the double-throw switch position to re-transfer the power through the main transformer 3 until such time that the demand declines back to its low demand assumed normally under the non-occupancy hours.

It shall be understood, therefore, that the contact device of the current sensing relay 9 assumes an overriding control over the program timer switch 7 to temporary transfer the power back on the main transformer.

In FIG. 1, there is also included a shunting means denoted by the reference numeral 10 connected across the main transformer to short circuit or by-pass the open-circuited core during the non-occupancy periods as otherwise it would present a load on the auxiliary transformer. In the actual operation, when the primary of the main transformer opens and subsequently the auxiliary transformer closes, the application of the shunting means or by-pass switch across the core shall follow a sequential operation as follows:

At first the transfer switch actuates to open the power supply to the primary of the main transformer and subsequently closes to transfer the power on the auxiliary transformer. Secondly the interlocking type shunting means will short out the main transformer core in order to disconnect it from the auxiliary transformer load. In the reversed operation: at first the shunting means opens the main transformer core and thereafter follows the back-transfer of the power to the main transformer and the auxiliary transformer opens. The capacity of the shunting means shall be of relatively small size as the opened main transformer core carries only the exciting current.

In order to secure the required sequence of the switching actions, a time delay means denoted by the reference numeral 10a is interposed into the control circuit of the shunting means 10 and interlocked with the control coil 2c of the transfer Switch 2. The time delay means controlling the sequential actions may assume any type of component element known in the art to perform the desired actions.

Basically any type of time-delay and interlocking means can be applied, as long as the strict sequential operation is established with acceptable safety. The omission of this feature is indicated in the alternate embodiment of FIG. 5.

Figure 1A:
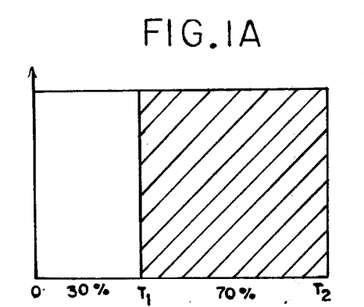
FIG. 1A illustrates the energy curve represented by the reduction of the transformer no-load losses during the non-occupancy periods.

FIG. 1A illustrates the time-curve of the Kilowatt-Hours energy saving during the non-occupancy hours between T1 and T2 represented by the dashed lines. In a typical office building application the occupancy hours representing about 30% of the total period. Since the auxiliary transformer is selected to be about 5% of the main transformer rating, the saving in no-load losses amounts to about 70% of the total energizing power.

Figure 1B:
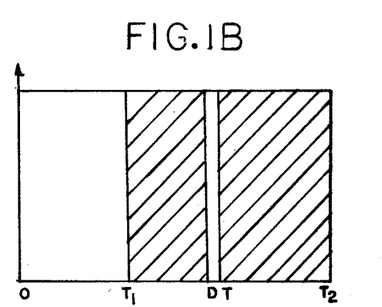
FIG. 1B illustrates a combined time-curve diagram to indicate a momentary deviation of the demand load under the non-occupancy periods.

FIG. 1B illustrates the time curve for the case when during the non-occupancy hours a sudden demand occurs as a momentary condition. Accordingly the current sensing relay will actuate to retransfer the power from the auxiliary to the main transformer to satisfy the momentary demand and after the time interval DT when the demand declines to a predetermined minimum level, the transfer back to the auxiliary transformer takes place.

It is to be noted that any possible overloading of the auxiliary transformer is fully prevented by the current sensing relay control action transferring the operation on the main transformer before the demand current reaches a magnitude above its rating. Accordingly, the load supply is practically not interrupted by the rapid control action.

Figure 2:
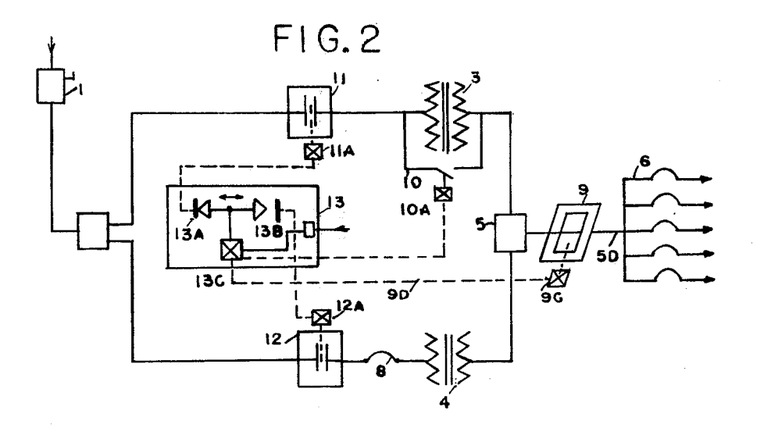
FIG. 2 is a diagrammatic illustration of the power transfer in conjunction with two separate switching means controlled by various control means.

FIG. 2 is a diagrammatic view of a specific embodiment of the invention utilizing two separate switching means instead of the double-throw transfer switch being equipped with electrical and/or mechanical interlocking to secure a sequential operation to exclude any possible simultaneous switching or operation.

Reference numeral 11 denotes a switching means of large capacity corresponding to the rating of the main transformer 3, whereas the switching means 12 of relatively small capacity corresponding to the rating of the auxiliary transformer 4. The program timer switch denoted by the reference numeral 13 assumes a double-throw type structure to actuate a sequential switching or power transfer from the main to auxiliary transformer, or vice-versa, as per scheduled timing periods. Therefore the time control contacts 13a,13b, respectively are interwired and interlocked with the respective operating coils 11a,12a of the cooperating power switching means 11,12 respectively. The contact device 9c is connected by wiring 9d to the operating coil 13c of the timer switch 13, whereby the current sensing relay means 9 actuates the power transfer as per variable demand.

The specific advantage of this embodiment lies in the fact that the power switching for the auxiliary transformer may be of relatively small capacity and otherwise the usage of two separate power switches provides a substantial cost reduction as compared with the cost of the transfer switch.

Otherwise all operating conditions are fully identical to that described under FIG. 1, so no further details are given. All identical component-elements are denoted by like reference characters indicated under FIG. 1.

It is generally to be noted that the power transfer taking place at the time-moment of the actual non-occupancy hours when the demand drops to a very low level, say about 5%, consequently during the power transfer switching action, to be considered practically as instantaneous, any arcing or inrush current are eliminated and eventually no resetting of smaller motors would be necessary under such conditions.

Figure 3:
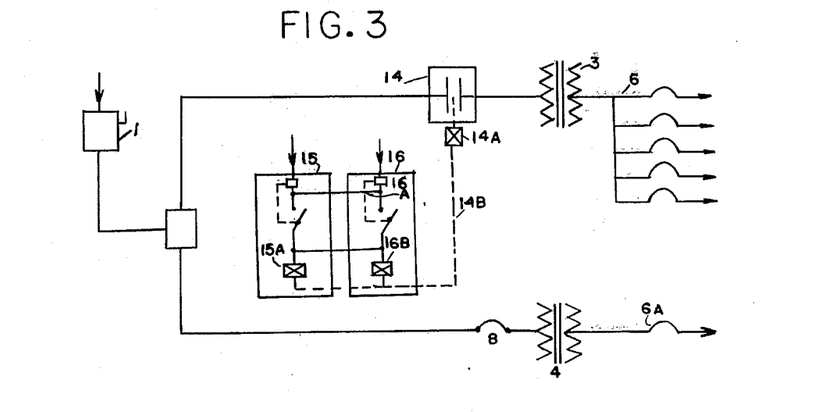
FIG. 3 is a diagrammatic illustration of a simplified embodiment of the invention utilizing only one switching means for the main transformer while the auxiliary transformer is constantly energized during both the occupancy and non-occupancy periods.

FIG. 3 is a diagrammatic illustration of a simplified embodiment of the invention with the specific feature to utilize only one power switching means for the control of the main transformer power supply, while the auxiliary transformer remains constantly energized to operate the minimum load requirements during the full 24 hours. All identical component elements are denoted by like reference characters of the former Figures. Auxiliary load denoted by numeral 6a.

Reference numeral 14 denotes an automatic switching means, a contactor or the like, of a capacity corresponding to the rating of the main transformer. The operating coil 14a of the switching means 14 shall be connected by wiring 14b to the program timer switch coil denoted by the reference numeral 15, to control the power supply as per scheduled timing periods of the occupancy and non-occupancy hours.

Should additional load required by any occupant during the non-occupancy hours as an overtime work, the main transformer shall be temporary re-energized by the following method:

A by-pass switching means denoted by the reference numeral 16 shall be connected across the program timer 15 to be manually operated by the occupant to override it for the temporary needs. However, it must be secured that after completion of the temporary work, the occupant will not let the main transformer in the energized condition until the morning or next operating period by re-opening the by-pass switching means.

For this purpose, the invention has the provision for a type of by-pass switching arrangement with the specific characteristics to automatically open the by-pass switch causing an override effect and restoring the control on the main program timer after a duration of a predetermined time-interval, say 1 hour, after the occupant already re-energized the main transformer for his temporary usage.

As a preferred embodiment, the structure of the by-pass switching means being modified by incorporating into its structure a specific timer-switching means 16a and coil 16b to constitute an integral part thereof to be denoted by the intercombined structure 16–16a. Accordingly upon actuation of the modified structure of the by-pass switching means 16, the short circuit produced across the program timer 15 will automatically open after a predetermined time-interval, say one hour, to restore the control on the program timer to thereby de-energize again the main transformer as required by the time scheduled saving control action.

Should the occupant desire to continue the over-time work after the expiration of the first de-energization of the main transformer, the modified by-pass switching structure 16–16a must be manually reset again to short out the program timer for the next time-interval, whereupon the main transformer becomes again energized during this time-cycle.

With this specific control method of the invention it is fully secured that after a temporary usage of the main transformer it will become automatically de-energized, whereby the negligence of the occupant is avoided.

Figure 4:
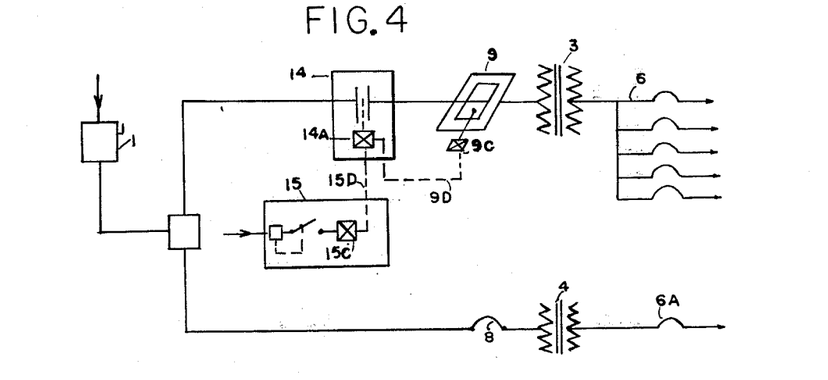
FIG. 4 is a diagrammatic illustration of a modified embodiment of that shown in FIG. 3, utilizing a demand current sensing relay means to control the energization of the main transformer in case of temporary demand load conditions.

FIG. 4 is a diagrammatic illustration of a modified embodiment of FIG. 3 including the current sensing relay means 9 with its control coil 9c being operatively interlocked by the wiring 9d with the control coil 14a of the switching means 14. The control coil 15c of the program timer 15 is also connected to the control coil 14a by wiring 15d so that a combined control action of both takes place.

The specific advantage of this modified embodiment lies in the fact that the manually operated by-pass switching means 16 is omitted and instead of this element the current sensing relay means is incorporated to automatically extend the energization of the main transformer as well as its de-energization, should the occupant require overtime work. Accordingly, the current sensing relay means takes over the control of the energization during the non-occupancy periods without the manual action of the occupant.

The operation may be summerized as follows:

If at the end of the occupancy period, the occupant continues to work and load current flows, the current sensing relay superimposes its control upon the program timer switch by maintaining the energization of the main transformer until such time the occupant finishes the work and stops the load current flow. At this moment the control action of the current sensing relay releases the energization by opening the power switching means and restoring the main control on the program timer.

It is generally noted that any program timer includes a conventional by-pass switch, not shown, on the various figures, to allow the energization or closing the power switching means in case of failure of the timer or for any other reasons.

Otherwise all identical component-elements are denoted by like reference characters of the former figures.

Figure 5:
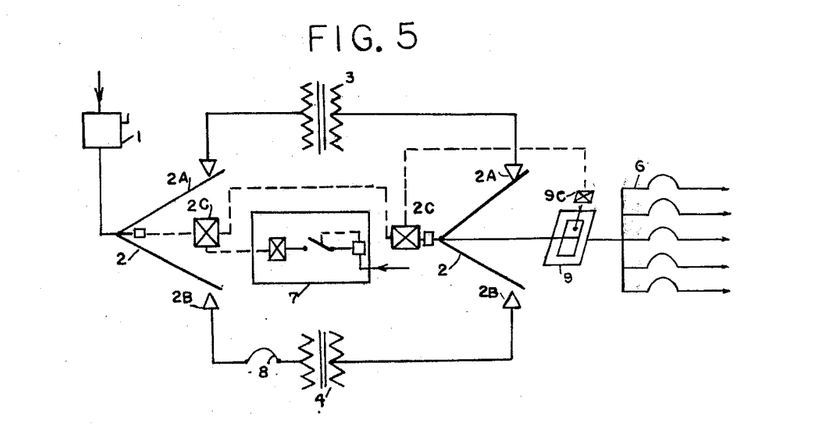
FIG. 5 is a diagrammatic illustration of a modified embodiment of that shown on FIG. 1, applying the double-thrown switching means in the primary and secondary side of the main transformer.

FIG. 5 is a diagrammatic illustration of a modified embodiment of FIG. 1 with the distinguishing feature of locating a transfer switching means 2 in the primary and secondary circuit of the transformers with corresponding ampere rating capacities. Otherwise all identical component-elements are denoted by like reference characters and so no further details are given.

The specific advantage of this modification lies in the fact that the shunting means 10 across the main transformer core may be omitted since it is fully disconnected by both transfer switching means and therefore the main transformer core will not constitute any load on the auxiliary transformer.

Figure 6:
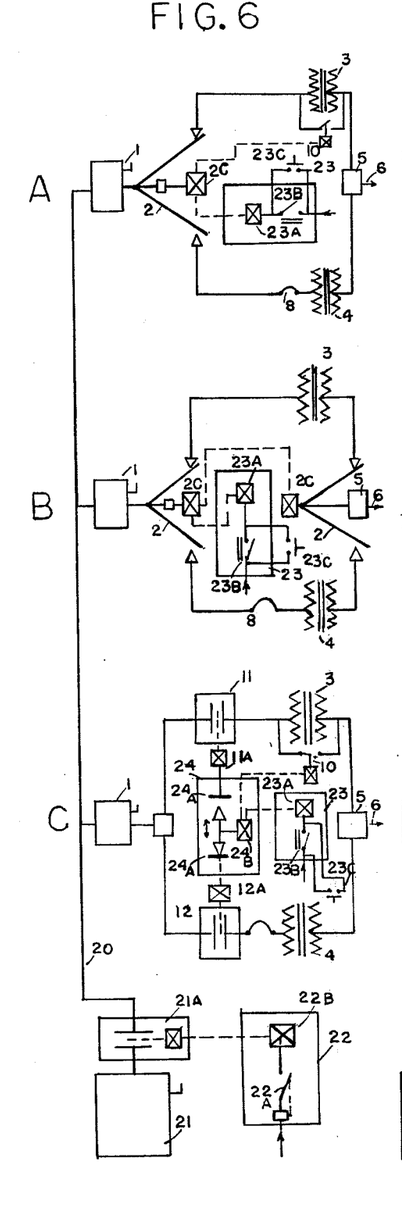
FIGS. 6 & 8 illustrate the application of the principles of the invention to a plurality of transformer units being controlled from a master program timer and actuated by momentary switching through the common power riser feeder.

FIG. 6 is a diagrammatic illustration of another embodiment of the invention to be applied to a plurality of transformer-units installed on various floors and supplied by a common power riser feeder. It is specifically applicable to high-rise office buildings or the like establishments where the occupancy periods are determined on the basis of weekly timing schedule.

In this figure all identical component-elements or parts are denoted by like reference characters.

It is to be noted that for a plurality of transformer units any of the energy conserving methods of this invention may equally be applied on the various floors and to be designated by the letters A, B, and C. Accordingly the "A" configuration uses the method indicated on FIG. 1, the "B" configuration uses the method indicated on FIG. 5, and the "C" configuration uses the method indicated on FIG. 2.

In order to secure the building owner's control on the energy saving operation by the various floor occupants, the following central control system methods shall be employed in accordance with the invention.

In such applications, the power is normally supplied by a common power riser feeder denoted by the numeral 20 connected to a main power switch denoted by the numeral 21 supplying energy to all transformer units. A master program time-control panel denoted by the reference numeral 22 is located in a central location to allow the full control of the programmed saving operation by the building owner.

This master control panel includes a program time-clock equipped with momentary switching contacts denoted by the reference numeral 22a and operating coil 22b being operatively interconnected with the power switch-tripping device of the momentary action type denoted by the numeral 21a to actuate a momentary interruption of the power supply to all transformer units at predetermined time-intervals during the non-occupancy hours only. The power switch tripping device shall be of the automatic resetting type to provide the momentary interruption, and following immediate re-energization.

In order to secure that after the momentary re-energization of the power supply, the main transformer units will remain de-energized, preferably a drop-out type relay means denoted by the reference numeral 23 is provided at each transformer units to be operatively connected to the control coil 2c of the transfer switch 2. It is noted that any type of voltage sensing means may be employed if capable to respond to the loss of voltage in providing a corresponding switching action. The main operating characteristics of such a voltage sensing means in this application is that upon momentary power interruption, the loss of voltage is sensed and subsequently actuates the control coil of the transfer switch to perform the change-over from main to auxiliary transformer operation.

As an illustrating embodiment, a drop-out relay means can preferably be applied to include a holding coil 23a with normally open contacts 23b connected in parallel with the starting switch 23c serving as a normally open momentary contact device or push-button. In the actual operation, upon the momentary power interruption in the common power feeder and following loss of voltage, and holding coil no longer holds the contacts and therefore it breaks the control coil circuit. In order to re-energize the main transformer, the starting momentary push-button must be depressed to allow control current to flow in the control coil of the transfer switch to actuate the reversed change-over from auxiliary to main transformer operation.

In the "A" and "B" configurations, the control coil of the double throw transfer switch is actuated by the voltage sensing or drop-out relay means to change its positions as required. However, in the "C" configuration indicating two separate power tripping devices as described in FIG. 2. Therefore in this application, a double-throw switching device denoted by the reference numeral 24 is disposed to actuate the change-over of the energization of the transformers thru the tripping devices 11a, 12a, respectively. Accordingly, the drop-out relay means 23 is interconnected with the control coil 24b to actuate the position 24a on either side as required to perform the change-over.

The master program timer control panel includes a momentary timer switching means 22a, the details of which are not shown here. In accordance with the invention, the specific feature would be to provide ON contact or closure during the full occupancy hours, whereas during the non-occupancy periods it shall provide a momentary Off contact or opening for a few seconds at predetermined hourly intervals and subsequent immediate reclosure during the duration of the hourly interval in order to restablish the energization of the common power feeder.

The specific operation of the momentary switching device in the master program timer control panel lies in the fact that the common power riser feeder remains constantly energized, except during the momentary interrupting instants, thereby to have power available at all units and at all times during the non-occupancy periods.

If any of the floor occupants desires to continue working beyond the established occupancy hours, this system method allows any individual floor occupant to override the master program-timer unit at any time of the non-occupancy hours for his own unit without affecting the transformer units on the other floors. Such overriding, of course, can take place between each momentary switch-action or power loss at each time interval as selected by the building owner. Accordingly, should any occupant desire to work beyond such periodic interruptions, the restart button must be repeatedly actuated after each such periodic interruptions as per the on-off schedule being set-up in the master timer panel. Basically, the master program timer panel includes a combination time-clock system arrangement, whereby the power is supplied constantly during the occupancy hours to all transformer units, whereas it provides momentary interrptions at periodic intervals during the non-occupancy hours to secure the de-energization of the transformer units. At the start of the occupancy period, the occupant shall depress the start button once, whereby the main transformer becomes energized at the particular position of the transfer switch and remains energized during the full occupancy hours.

Figure 7:
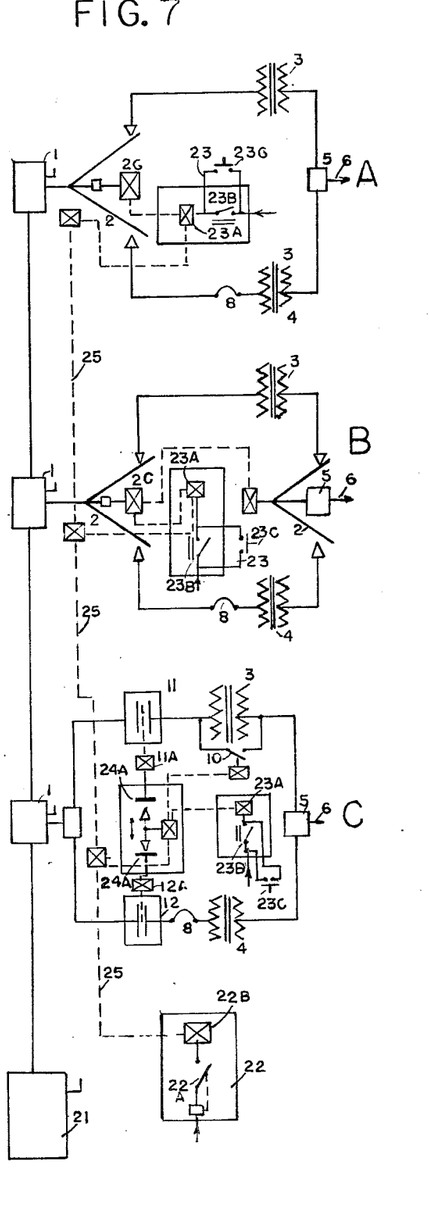
FIGS. 7 & 9 illustrate a modified embodiment of that shown in FIGS. 6 & 8, applying the principles of the invention to a plurality of transformer units supplied by a common power riser feeder and being controlled by a master program timer through separate control wiring connected to each unit.

FIG. 7 is a diagrammatic illustration of another embodiment of the invention to be applied to a plurality of transformer units differing from that shown on FIG. 6 in that a separate common control wiring is established between the master program timer control panel and the various individual control units at the respective transfer switches to provide timing control and momentary interruptions instead of using the common power feeder for this purpose.

In this embodiment, therefore, the common power feeder remains constantly energized without being interrupted at given time intervals during the non-occupancy hours. Accordingly, the control coil 22b of the master program timer 22 is directly connected by common control wiring denoted by the reference numeral 25 to the control coils of the transfer switches and control coils 23a of the drop-out relays controlling the timing operation of the transformer units. Consequently, each power transfer from auxiliary back to the main transformer can be initiated by depressing the restart button, whereby the main transformer becomes energized until the next momentary interruption thru the control wiring.

Otherwise all operating conditions are identical to that described under FIG. 6, so no further details are given. All similar component-elements of this figure are denoted by like reference characters of the former figures.

Figure 8:
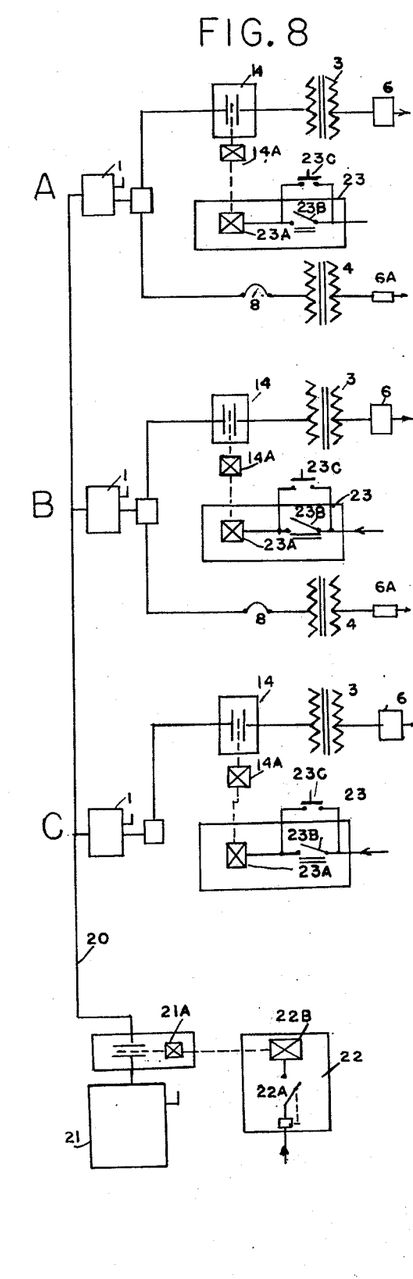

FIG. 8 is a diagrammatic illustration of a simplified embodiment of the invention as described in connection with FIG. 3, to be applied to a plurality of transformer units installed on various floors and supplied by a common power riser feeder.

This configuration differs mainly from that indicated on FIG. 6 in the constant energization of the auxiliary transformer and the substitution of an automatic power switching means for the double throw transfer switch. The configuration for the transformer equipment and wiring methods on the various floors are designated by the letters A,B and C. The configurations A and B are identical to that shown on FIG. 3, whereas in configuration C, the auxiliary transformer is omitted for applying it in such cases when no minimum load is necessary to be operated during the non-occupancy periods.

Similarly to that described under FIG. 6, the momentary interruption of the common power feeder is being employed in conjunction with the application of loss of voltage sensitive or drop-out relay means.

In this figure, therefore, the drop-out relay means 23 is operatively connected to the control coil 14a of the power switching means 14 to disconnect the power supply thru the main transformer, whereby it becomes fully de-energized and the auxiliary transformer supplies the minimum power needed during the non-occupancy periods. By pressing the restart button 23c, the control coil 23a actuates the main switching means 14 thru its coil 14a to reclose with following re-energization of the main transformer.

In a similar manner, if any occupant desires to continue working beyond the established occupancy hours, he may override the master program control panel 22 for his own unit only. Such overriding may take place between each momentary power interruption. Therefore, after each periodic interruption by the master program timer, the restart button must repeatedly by actuated. Otherwise the operation of this embodiment is identical to that described in connection with the application of a plurality of transformer units described under FIG. 6. All component-elements are denoted by like reference characters.

Figure 9:
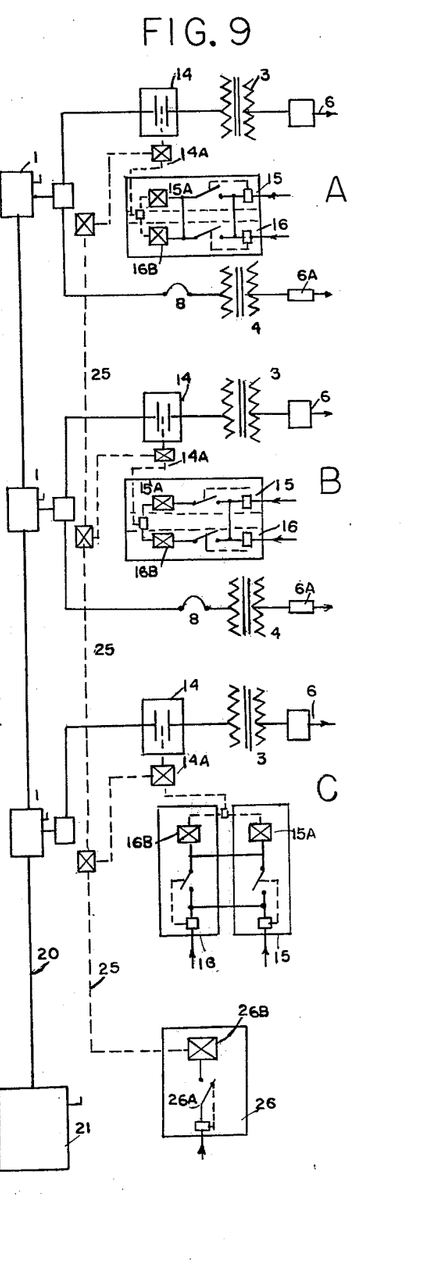

FIG. 9 is a diagrammatic illustration of another embodiment of the invention to be applied to a plurality of transformer units differing from that shown on FIG. 8 in that a separate common control wiring is established between the master program timer control panel and the various control coils at the respective transformer power switching means to provide only timing control during the occupancy periods for all units, whereas individual control of the units during the non-occupancy periods takes place by special timer-switches at the respective floor units.

Accordingly, the master program timer control panel denoted by the reference character 26 reduces to a simplified timer-switch structure controlling merely the on-off switching of power at each start and end of the occupancy period. Since no momentary interruption of power takes place at timed intervals during the non-occupancy periods thru the common control wiring, the drop-out relay means is omitted.

Accordingly, the control coil 26b of the master program timer panel 26 is directly connected by common control wiring 25 to the control coils 14a of the power switching means 14 at all power transformer units on the various floors. For the individual unit control, the combination by-pass timer switching means 16 is utilized to be operatively connected across the operating coil 14a of the power switching means 14 and by its actuation it provides an overriding effect. The operation of the combination by-pass switching means 16 is fully described in connection with the FIG. 3, so no further details are given.

Should any occupant desire over-time work beyond the normal occupancy hours, the by-pass timer switch shall be manually operated to short out the master program timer control in order to override it strictly for a time-period, say 1 hour, as being set by the by-pass timer switch.

After expiration of the timed by-pass switch period, the control on the master program timer is again restablished, thereby the main transformer at this particular station is de-energized as being required by the time scheduled saving control action.

The configuration C indicates an utmost simplified arrangement of the energy conserving transformer power supply system to be applied in all cases not requiring to operate any portion of the load during the non-occupancy hours. In this case the auxiliary transformer is omitted, however, all applicable control methods for the main transformer as provided in this invention, are identical.

The application of the common control wiring for the time-scheduled operation of all transformer units in conjunction with the individual by-pass timer-switching devices represent a most economical system installation providing the building-owner with the desired full control on the energy savings. More particularly, the control wiring may be run in the conduit carrying the power feeders for the transformer units so that no separate conduit installation is required. Note that for a plurality of transformers any configuration of this invention may equally be applied.

While in the foregoing there has been shown and described some of the preferred embodiments of this invention, it will, of course, be understood that various details of construction, combinations and intercombination of various elements or components and arrangements of parts may be resorted to without departing from the principles of the invention including its spirit and scope, it is, therefore, not the purpose to limit the patent granted thereon otherwise than necessitated by the scope of the appended claims.

What I claim as new and desire to secure by Letters Patent of the United States is:

1. An energy conserving transformer power supply system having a plurality of power transformer groups at various remote locations, a common power feeder, a common power switching means, a master program timer switching means, said common power feeder supplying said power transformer groups, said master program timer switching means operatively connected to said power switching means controlling the power flow through said common power feeder, each of said transformer groups comprising: a main transformer of large capacity, an auxiliary transformer of relatively small capacity, a common load, a transfer switching means, a relay control means, said transfer switching means adapted to alternately transfer power to said common load through said main transformer or said auxiliary transformer, each of said relay control means operatively connected to said common feeder, said relay control means adapted to control the alternate operation of said transfer switching means in accordance with predetermined timing schedules of the occupancy and non-occupancy periods of said master program timer switching means being in operational relationship with each of said relay control means, thereby to fully de-energize said main transformer of each said transformer groups during said non-occupancy periods.

2. An energy conserving transformer power supply system according to claim 1, wherein said common power switching means comprising a circuit breaker momentary tripping device being connected in series with said common power feeder controlling the power flow therethrough, said master program timer switching means comprising a time clock with momentary contact switching device operatively connected to said circuit breaker tripping device, the momentary switching action of said time clock controlling the momentary tripping of said circuit breaker tripping device during non-occupancy periods, thereby causing a momentary de-energization and subsequent immediate re-energization of said common power feeder in accordance with predetermined timing schedules of said non-occupancy periods based on time-intervals.

3. An energy conserving transformer power supply system according to claim 1, wherein said relay control means comprising: a momentary contact device, a dropout relay means, said momentary contact device in conjunction with said dropout relay means operatively connected to said transfer switching means to actuate the power transfer from said main transformer to said auxiliary transformer upon momentary opening the power supply through said common feeder and to actuate the retransfer of power from said auxiliary to said main transformer upon starting said momentary contact device at any selected transformer group during said non-occupancy periods based on limited time-intervals.

4. An energy conserving transformer power supply system according to claim 1, further comprising a common control wiring, said common control wiring operatively connected to said master program timer switching means and interconnected to said relay control means of each of said transformer groups, each of said relay control means comprising a momentary contact device, a dropout relay means, said momentary contact device in conjunction with said dropout relay means operatively connected to said transfer switching means to actuate the transfer of power from said main transformer to said auxiliary transformer upon opening the circuit of said common control wiring and to retransfer the power from said auxiliary transformer to said main transformer upon starting the said momentary contact device at any selected transformer group during said non-occupancy periods based on limited time-intervals.

5. An energy conserving transformer power supply system having a plurality of power transformer groups at various remote locations, a common power feeder, a common power switching means, a master program timer switching means, said common power feeder supplying said power transformer groups, said master program timer switching means operatively connected to said power switching means controlling the power flow through said common power feeder, each of said transformer groups comprising: a main transformer of large capacity, an auxiliary transformer of relatively small capacity, a main load, a power switching means, an auxiliary load being continuously supplied by said auxiliary transformer, a relay control means, said power switching means adapted to switching power to said main load through said main transformer, each of said relay control means operatively connected to said common feeder, said relay control means adapted to control the switching operation of of said power switching means in accordance with predetermined timing schedules of the occupancy and non-occupancy periods of said master program timer switching means being in operational relationship with each of said relay control means, thereby to fully de-energize said main transformer of each said transformer groups during the said non-occupancy periods.

6. An energy conserving transformer power supply system according to claim 5, wherein said common power switching means comprising a circuit breaker momentary tripping device being connected in series with said common power feeder controlling the power flow therethrough, said master program timer switching means comprising a time clock with momentary contact switching device operatively connected to said circuit breaker tripping device, the momentary switching action of said time clock controlling the momentary tripping of said circuit breaker tripping device during non-occupancy periods, thereby causing a momentary de-energization and subsequent immediate re-energization of said common power feeder in accordance with predetermined timing schedules of said non-occupancy periods based on limited time intervals.

7. An energy conserving transformer power supply system according to claim 5, wherein said relay control means comprising: a momentary contact device, a dropout relay means, said momentary contact device in conjunction with said dropout relay means operatively connected to said power switching means to actuate the switching off power to said main transformer upon momentary opening the power supply through said common feeder and to actuate the reclosing of power supply to said main transformer upon starting said momentary contact device at any selected transformer group during said non-occupancy periods based on limited time-intervals.

8. An energy conserving transformer power supply system according to claim 5 further comprising a common control wiring, said master program timer switching means limited to provide timing control of the occupancy periods, said common control wiring operatively connected to said master program timer switching means and interconnected to said relay control means of each of said transformer groups, each of said relay control means further comprising a combination by-pass timer switching means preset for a given limited time-interval, said by-pass timer switching means operatively connected to said power switching means to actuate the switching of power to said main transformer upon closing said by-pass switching means, thereby to override the control of said common control wiring and to re-energize said main transformer for a limited time-interval during the non-occupancy periods at any selected transformer groups.

9. An energy conserving transformer power supply system according to claim 5, wherein said auxiliary transformer and said auxiliary load being omitted.

* * * * *